Patented Apr. 22, 1952

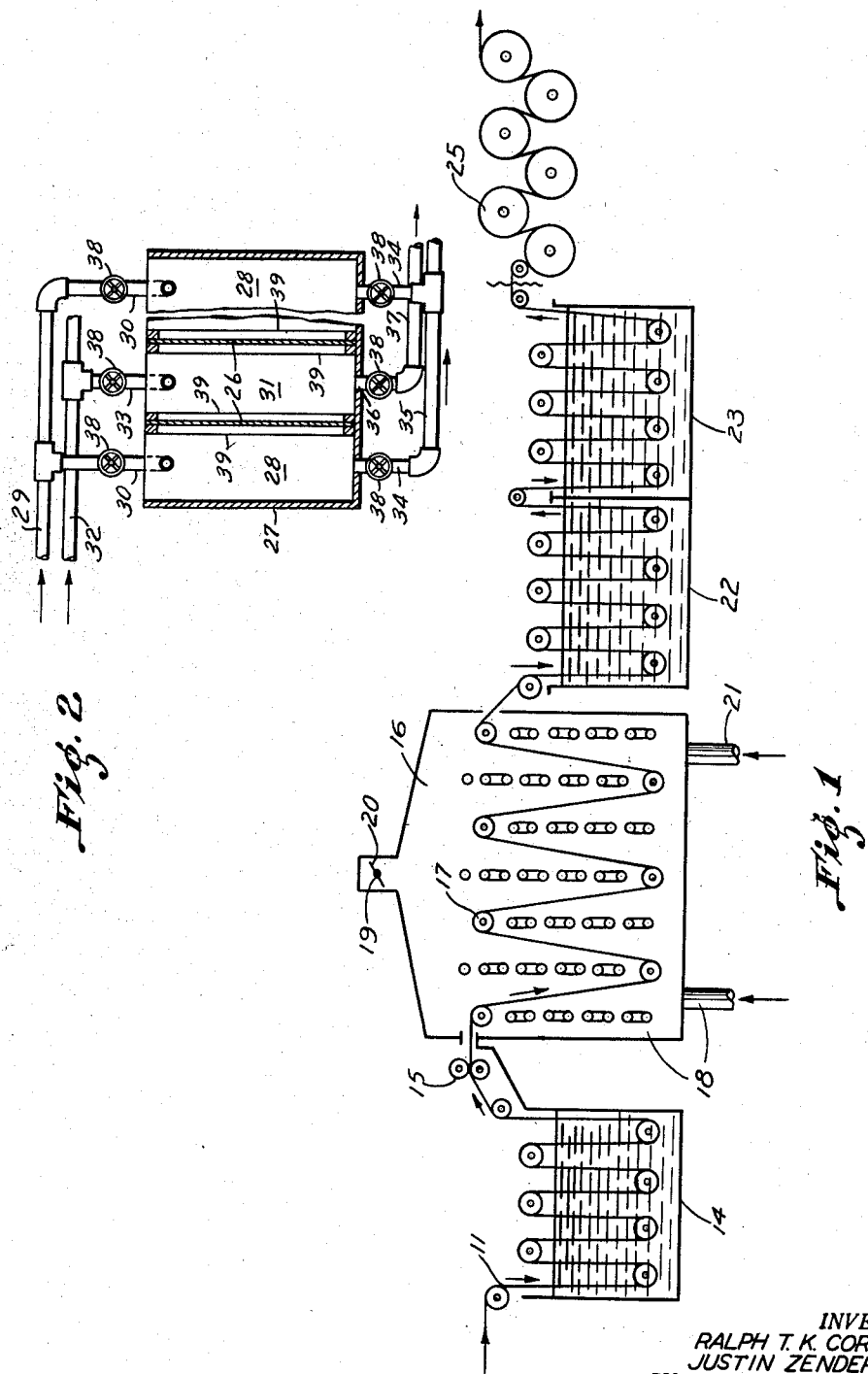

2,593,540

UNITED STATES PATENT OFFICE 2,593,540

SEMIPERMEABLE MEMBRANE

Ralph T. K. Cornwell, Fredericksburg, Va., and Justin Zender, Ardsley, N. Y., assignors, by mesne assignments, to American Viscose Corporation, Wilmington, Del., a corporation of Delaware Application September 1, 1945, Serial No. 614,030

4 Claims. (Cl. 210—8.5)

This invention relates to dialyzing methods and apparatus and more particularly to semipermeable membranes having a deposit of a polymerized organic composition therein, and characterized by an increased selective permeability.

It is frequently necessary to separate crystalloids from colloids and colloids of different molecular size from each other when present in the same liquid medium. To achieve such a selective separation by dialysis, a membrane which will permit one of the substances to diffuse through it while, at the same time, retaining the other substance is usually employed.

It has been supposed that the permeability of such a membrane depends upon the size of the molecule, for molecules containing less than a certain number of atoms diffuse through the membrane relatively easily, while to molecules of larger sizes the membrane is impervious. However, it has been found that membrane permeability may be influenced by other factors, particularly upon chemical forces.

The influence of chemical forces arising in the membrane is illustrated by membranes which contain a deposit of inorganic substances within their pores. Preparation of a membrane of this type is described in United States Patent 2,361,000 to Justin Zender. These membranes are impermeable to ions which form a part of the membrane deposit or which would form an insoluble compound with one of the ions of the deposit. For example, copper ferrocyanide is impermeable both to copper salts and to ferrocyanides. Moreover, the insoluble salts do not form permanent deposits since they may dissolve in certain acid or alkaline media. The deposits are, therefore, not inert. As a result, the salts deposited may contaminate solutions dialyzed. These membranes have the further disadvantage of requiring several treatments with the salt which is deposited on them or which reacts to form a deposit before sufficient deposit may be built up to render the membrane semi-permeable to a desirable degree.

In accordance with this invention, semipermeable membranes are prepared by impregnating a pellicle of hydrophilic organic material with a polymerizable organic composition which is then polymerized in situ to form a water-insoluble deposit within the pellicle. The deposit thus formed is inert and permanent, thereby providing a semi-permeable membrane having a wide variety of uses.

For the purposes of this invention the term "polymerizable organic composition" will be understood to mean any organic composition which is liquid at room temperature—that is, within the range of approximately 15° C. and 40° C.— and is polymerizable at least initially to an organic resin solid at room temperature. The term includes compositions liquid at room temperature and also solid or liquid compositions dispersed or dissolved in any volatile solvents, either organic or aqueous. Within the scope of the terms "liquid resin" or "polymerizable organic composition" will be included monomeric resin-forming materials and partially polymerized or incompletely reacted resins of either thermosetting or thermoplastic types.

In the drawing, Figure 1 illustrates one type of apparatus suitable for producing the semipermeable membrane of the invention and Figure 2 shows dialyzing apparatus provided with the membrane of the present invention.

The pellicle 11 of a hydrophilic organic material, such as regenerated cellulose, which is employed in preparing the semi-permeable membrane of the invention is in the wet gel state and is unplasticized but has been bleached and washed. While in a neutral or slightly acid condition it is passed into the bath 14 which contains a solution or dispersion of the polymerizable organic composition. The pellicle is impregnated with the composition, and excess composition is removed by the squeezing rolls 15 through which the pellicle next passes. Upon leaving the bath, the impregnated wet film is then passed through a baking chamber 16. This chamber is heated at a temperature which will polymerize the impregnated composition to a stage at which it is insoluble in water. In order to prolong the time required by the film to traverse the chamber, it is passed over a plurality of rolls 17. The film is heated during its passage by steam coils 18 which are disposed in vertical columns on one or both sides of the pellicle. The atmosphere within the baking chamber is kept humid in order to prevent the wet gel film from drying out. The damper 19 controls the flow through the pipe 20 of heated air having high relative humidity which is introduced through the pipe 21. Thus, the air within the chamber is continuously changed, thereby removing the vapors liberated during the polymerization of the impregnated composition.

The film 11 next passes through a rinsing bath 22 in which it is washed to remove excess materials or residual acid. The film is plasticized by passage through the bath 23 and is then dried by passing over the heated cylinders 25. During drying, polymerization of the resin may be continued until the resin is in a water-insoluble solid stage, where the resin originally applied was in an incompletely polymerized stage.

Fiugre 2 illustrates one form of dialyzer using one or more semi-permeable membranes of the present invention in the form of sheets or films 26, though other forms may be used, such as tubes or bags as mentioned hereinbelow. The dialyzer comprises a main tank, vessel or other container 27 which may be closed or open at the top as shown. The membranes 26 divide the container 27 into a plurality of adjacent chambers alternate ones of which designated 28 may be supplied with the raw solution or dispersion to be dialyzed, such as through the header 29 (and suitable branch pipes 30), the intervening chambers 31 being supplied with water or other solvent, if desired, through the header 32 (and branch pipes 33). Branch conduits 34 connected to a common discharge header 35 serve to discharge effluent from chambers 28 and similar branch conduits 36 connect chambers 31 to a common discharge header 37. Valves 38 may be provided in all of the branch pipes 30, 33, 34, and 36 in conventional manner. The membranes 26 may be held in place by suitable clamping frames 39 which must make a liquid-tight joint with the adjacent bottom and side walls of container 27 to assure that the only transmission of material components of the solutions in the several chambers 28 and 31 is through the membranes 26. If desired, the liquid to be dialyzed may be introduced into chambers 31 instead of 28, water or other solvent being fed in such case to chambers 28 when such water or solvent is to be used.

The following examples also illustrate the invention:

Example I

A sausage casing of denitrated nitrocellulose having a wall thickness of 0.0019 to 0.0026 inch was treated with a solution of 2% sodium perborate to remove oil film and surface deposit. The casing was then washed to remove excess sodium perborate. An aqueous acetic acid solution having pH of 6.5 containing 2.4% melamine formaldehyde resin by weight was prepared, and the casing impregnated therewith. After squeezing out excess impregnating solution, the wet casing was passed through a chamber heated at a temperature which polymerized the resin to an infusible water-insoluble stage.

The impregnated sausage casing was then used as a dialysis membrane to separate glycerol from glycerol mash. The test was run side by side with an untreated sausage casing of denitrated nitrocellulose, using another portion of the same glycerol mash. The results were as follows:

| | Glycerol Passed | Solids Passed | Color of Diffusate |
|---|---|---|---|
| | Percent | Percent | |
| Treated cellophane | 3.65 | 0.88 | Light straw—clear. |
| Untreated cellophane | 3.65 | 2.35 | Dark, cloudy (some colloidal gum came through). |

The diffusate in the case of the treated cellulose was so good in quality that it could be used as a plasticizer for cellophone without further treatment.

Example II

A film of regenerated cellulose 0.002 inch thick was washed in a bath containing 2% sodium perborate for 20 minutes. After washing with water, the film was passed into a bath containing an aqueous dispersion of melamine formaldehyde resin containing approximately 2% resin by weight. After the film had been thoroughly impregnated, it was passed through squeeze rolls, which removed excess dispersion, into a steam-heated chamber. The pressure of the steam within the steam chamber was 40 pounds per square inch. The relative humidity was close to 100% to avoid drying out the film while permitting slow evaporation of the water acquired during impregnation with resin dispersion. After the resin had polymerized to a solid, infusible, water-insoluble stage, the film was washed free of acid.

It was found that the treated film when used as a membrane in the dialysis of beer slops passed glycerol readily while retaining certain salts, colored matter, and other colloidal impurities.

Example III

A black strap molasses containing 65% sugar and 11% impurities was dialyzed through a film of regenerated cellulose. The diffusate contained between 25% and 35% solids, of which 23% to 32% were sugars and 2% to 5% were ash, mostly potash and calcium oxide. The diffusate was clear and light colored.

The same molasses was dialyzed through a self-sustaining film of regenerated cellulose containing a deposit of melamine formaldehyde resin in an insoluble infusible stage. The diffusate was clear and colorless. The membrane passed 80% of the salt which had been present in the molasses while retaining the sugar and colloidal impurities. The sugar residue was then dialyzed through untreated number 300 cellophane. This passed the sugar while retaining the colloidal impurities. As a result, a sugar diffusate containing only an infinitesimal amount of salt was obtained.

Thus, when membranes of this invention are employed it is possible by a two-step dialysis process to obtain nearly pure sugar from molasses. In the former process it was necessary to treat the sugar-salt diffusate obtained with ion exchange resins or other means to remove the salts and obtain the sugar.

In order to prepare the pellicle for impregnation, it is often desirable to swell it prior to impregnation. Swelling agents, such as zinc chloride, sodium hydroxide, calcium thiocyanate and the like, may be employed. It has also been found desirable to treat the pellicle with a detergent or saponifying agent to remove impurities, such as oil films, grease, and dirt, prior to impregnation. Thus, the pellicle may be treated with a solution of sodium perborate, followed with a bath with an acid such as acetic acid or oxalic acid to neutralize residual perborate. The pellicle may then be washed and impregnated.

In preparing the semi-permeable membrane of the invention, the polymerizable organic composition employed is preferably applied to the membrane in solution in a suitable solvent, preferably one having a swelling action on the membrane. Such solvents adapted to swell pellicles of the type employed in the invention include water or substances miscible therewith, including lower monohydric aliphatic alcohols, such as methyl and ethyl alcohol; polyhydric aliphatic alcohols, such as glycerine, ethylene glycol, di- and triethylene glycol; hydroxy amines, such as ethanolamine, diethanolamine and triethanolamine, and mixtures of one or more of these solvents with each other or with water.

It is essential to allow sufficient time for the impregnating liquid to diffuse throughout the pellicle and thereby carry the polymerizable organic composition into the body of the material. Following impregnation, excess impregnating liquid should be removed in order to insure polymerization of the composition within the pellicle and not on the surface. The surplus impregnating solution should therefore be remove by doctor blades, squeeze rolls or other suitable means, preferably followed by a rinsing of the treated pellicle with water. The pellicle is then passed into a heated chamber or allowed to stand at room temperature, as may be required, in order to complete polymerization of the impregnating composition.

The pellicles employed in forming the semi-permeable membrane of the invention may be of fibrous or non-fibrous hydrophilic organic material.

The non-fibrous material, from which pellicles may be formed, comprise film-forming water-swelling (that is, hydrophilic) colloids as a group such as, for example, cellulose hydrate, alkali-soluble cellulose ethers, hydrophilic cellulose esters, hydrophilic mixed ester-ethers of cellulose, gelatin, casein, de-acetylated chitin, water-swelling resins and the like. The hydrophilic cellulose ethers may comprise the alkyl ethers, the hydroxy-alkyl ethers, the carboxy-alkyl ethers, and the mixed ethers, such as alkyl hydroxy-alkyl cellulose ethers, and the cellulose ether xanthates. The cellulose esters which may be used include water-swelling compounds such as low-nitrated cellulose nitrate, low esterified cellulose acetate and cellulose formate, and the like. Cellulose hydrate may be regenerated from viscose or cuprammonium solutions of cellulose or from solutions of cellulose in inorganic or organic solvents. Among the water-swelling resins which may be used are the water-swelling polymers of acrylic acid, water-swelling, urea-formaldehyde resins, water-swelling methyl-methacrylates, phe resins, water-swelling methyl-methacrylates, phenol-formaldehyde resins in the "A" stage, and the polyvinyl alcohol resins in the "A" stage, and the like.

The hydrophilic fibrous materials from which the membrane may be formed comprise organic pellicles formed of parchment paper, pellicles formed of leather scrap, and the fibre-bonded felted papers made according to the copending application of Carleton S. Francis Jr., Serial Number 300,876, filed October 23, 1939, now Patent 2,459,803.

In the preferred embodiment there is employed a membrane formed of denitrated nitrocellulose. The pellicle employed in the invention as the dialyzing membrane may be in the form of a foil, film, sheet, bag or tubing.

The polymerizable liquid organic composition employed to form a deposit within the pellicle may be a liquid pre-condensate capable of further polymerization to a solid resin or a solution or dispersion of solid or liquid pre-condensates.

Where it is desired to employ a liquid pre-condensate without the use of a solvent or dispersing medium, monomeric organic materials capable of being polymerized to a solid resin have been found satisfactory. In impregnating the pellicle with this pre-condensate, the resin may be heated slightly to reduce its viscosity and thus render impregnation more complete. The pellicle is heated to effect polymerization of the monomer.

Among such materials may be mentioned monomers which polymerize to thermoplastic or thermosetting resins, such as allyl alcohol or derivatives of allyl alcohol such as allyl chloride or bromide, furfural, furfuryl alcohol, acrylic acid esters, derivatives of vinyl alcohol, indene, liquid unsaturated or ethylenic hydrocarbons such as the heptylenes, octylenes, and the higher dienes, and coumarone.

Monomers of allyl alcohol are in general clear, colorless liquids of relatively low viscosity. When a pellicle impregnated with these alcohols is heated at temperatures of from 80° C. to 90° C. in the presence of a peroxide catalyst such as benzoyl peroxide, these monomers polymerize to a thermoplastic gel state. By heating the pellicle at 100° C., polymerization of the allyl resin may be completed, forming an infusible insoluble thermosetting resin deposit within the pellicle.

Permanently thermoplastic resin deposits may be prepared by employing, for example, liquid acrylic acid monomers or polymers, vinyl compounds, or unsaturated hydrocarbons having an ethylenic linkage. Among these monomers may be mentioned methyl acrylate, ethyl acrylate, butyl acrylate, methyl methacrylate, ethyl methacrylate, normal butyl methacrylate, isobutyl methacrylate, methoxyethyl methacrylate, and cyclohexyl methacrylate. Among the vinyl compounds which may be employed are vinyl acetate, vinyl ethyl ether, and mixtures of vinyl acetate or vinyl ethyl ether with any of the above acrylic acid derivatives. Certain vinyl compounds have very low boiling points. These may be employed if provision is made for conducting the polymerization reaction under pressure to prevent undue volatilization of the liquid.

In addition to monomeric resin-forming organic compounds, there may be employed partially (incompletely) polymerized resins of either the thermoplastic or thermosetting types which are liquid at room temperature. Liquid casting resins such as liquid phenol-formaldehyde or phenol-furfural liquid resin compositions and urea-formaldehyde are particularly suited to this invention. Liquid alkyd and liquid coumarone-indene resins which are capable of being further polymerized to a solid resin may also be employed. Polymerization of the resin may be halted at any step by removing the pellicle from the heated chamber. Thus, a great variety of membranes may be obtained by using only one resin, since the stage at which polymerization is stopped largely controls the properties of the semi-permeable membrane produced.

It is also to be understood that liquid thermosetting pre-condensates may be used in compatible admixture with liquid thermoplastic pre-condensates. Likewise, mixtures of thermosetting pre-condensates and mixtures of thermoplastic pre-condensates may be employed. The composition may also include suitable plasticizers where a deposit of maximum flexibility and resiliency is desired; preferably, plasticizers which do not take part in the polymerization reaction are used. Such plasticizers include completely reacted soft alkyd resins, dibutyl phthalate, and most waxes. Waxes also act as moisture- and waterproofing agents. Likewise, fireproofing agents, pigments, dyestuffs, and other materials may be added as desired. The plasticizer may be either volatile or non-volatile, depending upon whether or not its retention in the final deposit is desired.

In order to reduce the time and temperature required to polymerize the liquid initially upon the backing sheet, a polymerization catalyst may be added. Organic peroxides such as hydrogen peroxide or benzoyl peroxide are generally satisfactory. Certain pre-condensates such as phenol-furfural pre-condensates may be polymerized with either acid or alkaline catalysts.

Solutions and dispersions of solid resins in an incompletely polymerized stage may be also employed. Such resins include vinyl resins such as polyvinyl chloride, polyvinyl acetate, polyvinyl butyral, polystyrene, polyvinylidene chloride; copolmers of vinyl chloride and acetate, and vinyl chloride and vinylidene chloride; acrylic resins such as polymethyl methacrylate, phenol-aldehyde resins, urea-aldehyde resins, sulfonamide-aldehyde resins, and compatible mixtures of such resins.

It will also be understood that liquid pre-condensates, mentioned previously, which have been partially polymerized to a solid stage prior to application to the membrane may also be employed dissolved in a suitable solvent or suspended in a suitable dispersing medium.

It has been found that the resin-impregnated membrane of the invention possesses numerous unexpected advantages over inorganic salt-impregnated membranes of the prior art. It is possible to prepare membranes of lower permeability by the use of resins. A sufficient quantity of resin will render the impregnated membrane completely impervious to the passage of any material; such a result is impossible to achieve by the use of inorganic salts. Moreover, a membrane of the desired permeability may be obtained in one impregnation step when resins are employed, while repeated applications of inorganic salts are required to achieve the same result. As many as twelve treatments are required to prepare a suitable membrane when inorganic salts are used. Presumably because the pores of the finished membrane are smaller, a finer and cleaner separation is achieved with the membranes of this invention. This has been illustrated in the examples.

The dialyzing membranes may be used in combination with each other; for example, the membranes which may be formed according to the invention may be laminated or placed adjacent to one another, or they may be used individually or separately, or in combination with untreated sheets in a dialyzing process.

Among the many advantages which may be mentioned in employing the novel dialyzing membranes herein described, one dissolved substance in a complex solution may be substantially completely separated and removed from said solution with little loss of the other components which are retained in the solution, such as a process whereby an electrolyte such as salt, dissolved in a complex salt-sugar solution, may be separated from the sugars which comprise non-electrolytes, and with minimum loss of sugar from the solution. In employing the membranes in a dialyzing process, the operation proceeds in a uniform and regular manner without necessitating heat and/or pressure such as would be required in a distillation process. Furthermore, in attempting to separate one or more substances from a complex solution by means of distillation, the quality or chemical nature of such substances is often impaired or destroyed as a result of heating. The dialyzing membrane of the invention has been found to be very effective in efficiently separating various materials dissolved in complex solutions and at the same time such process involves little cost in the way of manufacture, operating expense, or labor.

The dialyzing membranes of the present invention have been found useful in the separation of various mixtures of substances in solution, suspension, and colloidal dispersion. The semipermeable membranes can be used for the separation of crystalloids from colloids; for example, the separation of salts and sugars from molasses, milk, blood, latex, and the like; separation of colloids of large molecular weights from those of smaller molecular weights such as, for example, the separation of mixtures of dextrins having different molecular weights, or the separation of impurities from vitamins, hormones, latex, milk, dextrins, and the like.

Having described our invention, what we claim as new and desire to secure by Letters Patent is:

1. The method of separating materials of differing molecular size and constitution from a mixture thereof comprising the step of dialyzing the mixture through a semi-permeable membrane comprising a non-fibrous pellicle of regenerated cellulose having a deposit of a water-insoluble melamine-formaldehyde resin formed therein.

2. Dialyzing apparatus comprising a container and at least one semi-permeable membrane dividing the container into a plurality of adjacent chambers, said membrane comprising a pellicle of hydrophilic film-forming cellulosic material having a deposit of a water-insoluble melamine-formaldehyde resin formed therein.

3. The method of separating colloidal materials and coloring matter from solutions and dispersions containing glycerol produced by the fermentation of carbohydrate-containing material, molasses, and the like which comprises dialyzing such dispersions through a semi-permeable membrane comprising a pellicle of regenerated cellulose impregnated throughout with an insolubilized melamine-formaldehyde resin.

4. The method of recovering sugar from molasses which comprises dialyzing the molasses through a semi-permeable membrane comprising a pellicle of hydrophilic cellulosic material having a deposit of a water-insoluble melamine-formaldehyde resin formed therein, whereby the salts diffuse through said membrane while sugar and colloidal impurities remain behind in the dialysate, and then dialyzing the resulting sugar-containing dialysate through a semi-permeable regenerated cellulose membrane whereby the sugar diffuses therethrough while the colloidal impurities remain behind.

RALPH T. K. CORNWELL.
JUSTIN ZENDER.

REFERENCES CITED

The following references are of record in the file of this patent:

UNITED STATES PATENTS

| Number | Name | Date |
| --- | --- | --- |
| 1,236,460 | McIntosh | Aug. 14, 1917 |
| 1,964,039 | Dreyfus | June 26, 1934 |
| 2,017,797 | Gardner | Oct. 15, 1935 |
| 2,022,490 | Charch | Nov. 26, 1935 |
| 2,028,776 | Hibbert | Jan. 28, 1936 |
| 2,107,805 | Russell | Feb. 8, 1938 |
| 2,111,808 | Soddington et al. | Mar. 22, 1938 |
| 2,135,349 | Meisse | Nov. 1, 1938 |
| 2,140,341 | Wallach et al. | Dec. 13, 1938 |
| 2,197,805 | Lovett | Apr. 23, 1940 |

(Other references on following page)

UNITED STATES PATENTS

| Number | Name | Date |
|---|---|---|
| 2,232,153 | Vohrer | Feb. 28, 1941 |
| 2,261,240 | Esselmann | Nov. 4, 1941 |
| 2,276,210 | Lave et al. | Mar. 10, 1942 |
| 2,316,274 | Mitchell | Apr. 13, 1943 |
| 2,339,885 | Schmid et al. | Jan. 25, 1944 |
| 2,355,822 | Rugeby | Aug. 15, 1944 |
| 2,357,767 | Robbins | Sept. 5, 1944 |
| 2,361,000 | Zender | Oct. 24, 1944 |
| 2,386,381 | Cornwall | Oct. 9, 1945 |
| 2,386,826 | Wallach et al. | Oct. 16, 1945 |
| 2,411,239 | Reichell et al. | Nov. 19, 1946 |
| 2,467,436 | Lanning | Apr. 19, 1949 |